US008270425B2

(12) United States Patent
Poola et al.

(10) Patent No.: US 8,270,425 B2
(45) Date of Patent: Sep. 18, 2012

(54) METHOD AND SYSTEM FOR MULTICAST VIDEO STREAMING OVER A WIRELESS LOCAL AREA NETWORK (WLAN)

(75) Inventors: Jeelan Poola, Bangalore (IN); Ravindra Guntur, Mysore (IN); Sukhdeep Singh Johar, Bangalore (IN)

(73) Assignee: Symbol Technologies, Inc., Holtsville, NY (US)

( * ) Notice: Subject to any disclaimer, the term of this patent is extended or adjusted under 35 U.S.C. 154(b) by 428 days.

(21) Appl. No.: 12/648,496

(22) Filed: Dec. 29, 2009

(65) Prior Publication Data

US 2011/0158146 A1  Jun. 30, 2011

(51) Int. Cl.
H04J 3/26 (2006.01)

(52) U.S. Cl. ......... 370/432; 370/338; 370/390; 370/401

(58) Field of Classification Search .................. None
See application file for complete search history.

(56) References Cited

U.S. PATENT DOCUMENTS

| | | | |
|---|---|---|---|
| 6,944,169 B1 | 9/2005 | Yoshizawa et al. | |
| 7,218,610 B2 | 5/2007 | Sivakumar et al. | |
| 7,274,740 B2 | 9/2007 | van Beek et al. | |
| 7,280,495 B1 | 10/2007 | Zweig et al. | |
| 7,787,436 B2 * | 8/2010 | Kish et al. | 370/349 |
| 8,125,975 B2 * | 2/2012 | Kish et al. | 370/349 |
| 2002/0136219 A1 | 9/2002 | Ding et al. | |
| 2006/0168133 A1 | 7/2006 | Park et al. | |
| 2007/0147314 A1 | 6/2007 | Taleb et al. | |
| 2007/0276954 A1 | 11/2007 | Chan et al. | |
| 2008/0040648 A1 * | 2/2008 | Li et al. | 714/776 |
| 2008/0043644 A1 | 2/2008 | Barkley et al. | |
| 2011/0299448 A1 * | 12/2011 | Meier et al. | 370/312 |

FOREIGN PATENT DOCUMENTS

| | | |
|---|---|---|
| EP | 1619839 A1 | 1/2006 |
| WO | 2004095185 A3 | 6/2006 |
| WO | 2009129367 A1 | 10/2009 |

OTHER PUBLICATIONS

Ravindra G; Thaliath J; Chakeres I D:"In-network optimal rate reduction for packetized MPEG video",Q2SWinet'08: Proceedings of the 4th ACM International Symposium on OoS and Security for Wireless and Mobile Networks, Oct. 27, 2008, pp. 55-61, XP002622008, Retrieved from the Internet: URL:http://portal.acm.org/citation.cfm?doi d=1454586.1454597 [retrieved on Feb. 10, 2011].

(Continued)

Primary Examiner — Bob Phunkulh

(57) ABSTRACT

A system and method for multicast video streaming over a wireless local area network (WLAN) improves scalability and reliability. The method includes configuring the WLAN access point with a reserved video bandwidth (step 1005). A multicast video stream including data packets marked with differentiated services code points (DSCPs) is then received (step 1010). The multicast video stream is then converted to a plurality of "n" unicast streams (step 1015). Data packets in the unicast streams are then streamed from the WLAN access point to a plurality of "n" mobile units using a selective packet discard algorithm that employs the DSCPs (step 1020).

18 Claims, 8 Drawing Sheets

OTHER PUBLICATIONS

Yun Tao Shi et al: "QoS issues in Wi-Fi-WMM based triple play home networks", Consumer Communications and Networking Conference, 2006. CCNC 2006. 20 06 3RD IEEE Las Vegas, NV, USA Jan. 8-10, 2006, Piscataway, NJ, USA,IEEE, vol. 1, Jan. 8, 2006,pp. 188-191,XP010893156,DOI: OI:10.1109/CCNC.2006.1593013 ISBN: 978-1-4244-0085-0 section 2.

Yang Xiao et al: "MAC 15-1—A Cross-Layer Approach for Frame Transmissions of MPEG-4 over the IEEE 802.11e Wireless Local Area Networks", Wireless Communications and Networking Conference, 2008. WCNC 2008. IEEE, IEEE, Piscataway, NJ, USA, Mar. 31, 2008, pp. 1728-1733, XP031243893, ISBN: 978-1-4244-1997-5 * abstract.

Zhiling Li et al: "Adaptive Cross—layerQoS for priority-based video streaming over wireless channel",Future Information Networks, 2009. ICFIN 2009. First International Conference on, IEEE, Piscataway, NJ, USA, Oct. 14, 2009, pp. 108-112, XP031570337, DOI: DOI:10.1109/ICFIN.2009.5339566 ISBN: 978-1-4244-5158-6 * abstract.

International Search Report & Written opinion for International Application No. PCT/US2010/059396 mailed on Feb. 23, 2011.

International Search Report & Written opinion for International Application No. PCT/U52009/067045 mailed on Jul. 13, 2010, related case.

International Preliminary report on Patentability & Written opinion for International Application No. PCT/US2009/067045 mailed on Jun. 23, 2010, related case.

Ravindra, G., et al., "Active router approach for selective packet discard of streamed MPEG video under low bandwidth conditions," IEEE International Conference on Multimedia and Expo (ICME 2000), pp. 739-742.

Ravindra, G., et al., "Application Specific Shaping of Streamed Video in Bandwidth Constrained Networks," Motorola Research Lab, India, pp. 8.

Zhang., Z, -L., et al., "Efficient Selective Frame Discard Algorithms for Stored Video Delivery Across Resource Constrained Networks," Real-Time Imaging, vol. 7, No. 3, Jun. 2001, pp. 255-273.

* cited by examiner

US 8,270,425 B2

METHOD AND SYSTEM FOR MULTICAST VIDEO STREAMING OVER A WIRELESS LOCAL AREA NETWORK (WLAN)

FIELD OF THE DISCLOSURE

The present invention relates generally to managing available bandwidth in WLANs, and in particular to managing available bandwidth for multicast video streaming.

BACKGROUND

With the advancement of communication technology, the use of video streaming has become an integral part of the lives of Internet users. Video streaming has also gained popularity in real-time surveillance, video conferencing, etc. However, with the increase in popularity of video streaming, various performance related issues have arisen, mainly as a result of bandwidth constraints. A typical example of these performance related issues is a user watching a streaming video on the Internet and not obtaining a required audio or video quality.

One of the reasons for poor video quality in Moving Picture Experts Group (MPEG) video is random packet loss in the streamed video Group of Pictures (GoP). A GoP is a logical partitioning of a sequence of video frames. A typical GoP includes three types of pictures or frames, namely, Intra coded pictures (I-frames), Predicted pictures (P-frames) and Bi-predictive pictures (B-frames). A GoP starts with an I-frame, which is also referred to as a key or reference frame. An I-frame is intra-coded, which means that the discrete cosine transform (DCT) co-efficients of pixel blocks are encoded without reference to pixel blocks of other frames. A P-frame is encoded using motion compensation and prediction. It consists of motion vectors which specify the extent to which a particular pixel block has spatially moved relative to its position in the previous reference frame. The reference for a P-frame could be an I-frame or a previous P-frame. B-frames, unlike I-frames and P-frames, contain bi-directionally predicted blocks. Therefore, to decode a B-frame, the past and future reference frames are needed.

Typically, whenever there is a bandwidth constraint, random packet loss occurs, regardless whether an I-frame is dropped or a P- or B-frame. As mentioned above, a P-frame is dependent on an I-frame and possibly other P-frames. Therefore, if packets containing I-frame data are dropped during random packet dropping, all the subsequent P-frames in that GoP will not be decoded properly. The same problem occurs if P-frames are randomly dropped, without considering their dependency on other P-frames.

One method to avoid random packet dropping is to reserve enough network level resources so that packet dropping does not happen. However, that method does not work when the demand for streaming video fluctuates, since the reserved network level resources may not be adequate when the demand surges.

Another approach is to tag packets in a video stream, where the network then decides the priorities of the packets. Only packets with high priority may be allowed to be transmitted. However, a fundamental problem with this approach is the need for a device which automatically tags a flow of video frames in a video stream. Also, this approach does not work when there is a bandwidth constraint and the demand for streaming videos changes dynamically.

In light of the foregoing, there is a need for an improved method and system for multicast video streaming over a WLAN.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
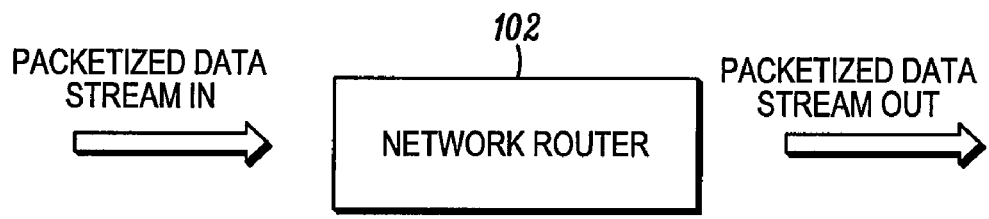
FIG. 1 is a block diagram of an exemplary network router in accordance with an embodiment of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

According to some embodiments of the present invention, a method enables multicast video streaming over a wireless local area network (WLAN). The method includes configuring a WLAN access point with a reserved video bandwidth. Data packets marked with differentiated services code points (DSCPs) are then received at the WLAN access point as part of a multicast video stream. Next, the multicast video stream is converted to a plurality of "n" unicast streams. Data packets in the unicast streams are then streamed from the WLAN access point to a plurality of "n" mobile units using a selective packet discard algorithm that employs the DSCPs.

For one embodiment, a method for managing a data stream in a communication network is provided as part of the selective packet discard (SPD) algorithm. The method includes receiving a packetized data stream including one or more data segments. Each data segment of the one or more data segments corresponds to a frame type of a plurality of frame types. Further, the method includes determining a number of data segments to be transmitted for each frame type of the plurality of frame types in the communication network, based on at least one predefined parameter. Furthermore, the method includes dropping at least one data segment for at least one frame type of the plurality of frame types, based on the number of data segments to be transmitted for each frame type, a functional dependency between the one or more data segments, and a functional dependency between the plurality of frame types. The method also includes re-packetizing the received packetized data stream based on the dropping of the at least one data segment.

FIG. 1 illustrates an exemplary network router 102 in accordance with an embodiment of the invention. As shown in the figure, the network router 102 receives a packetized data stream, which includes one or more data segments. The packetized data stream can be, for example, a Group of Pictures (GoP) in a Motion Picture Experts Group-2 (MPEG-2) or MPEG-4 transport stream. The GoP may be multiplexed with audio frames or it may be multiplexed without audio frames.

As mentioned above, a GoP includes a number of data segments. Each data segment corresponds to a particular picture or frame type. Examples of picture or frame types include Intra coded pictures (I-frames), Predicted pictures (P-frames) and Bi-predictive pictures (B-frames). Those ordinarily skilled in the art know that these frames may be functionally interdependent on each other. For example, an I-frame is intra coded and is not dependent on any of the other frames, a particular P-frame may be dependent on the I-frame or any P-frame preceding the particular P-frame, and a B-frame may be dependent on past or future frames with respect to the B-frame.

When the GoP is received by the network router 102, the network router selectively drops certain data segments in the GoP and transmits the rest of the data segments of the GoP. Before transmitting the GoP, the network router 102 re-packetizes the GoP on the basis of the selective dropping of the data segments. The entire method and system for selectively dropping data segments is explained in detail in conjunction with the rest of the figures.

It should be noted that although the invention is described below in conjunction with an MPEG-2 transport stream or video semantics, the invention can also work with a Motion Picture Experts Group-4 (MPEG-4) transport stream or video semantics.

Figure 2:
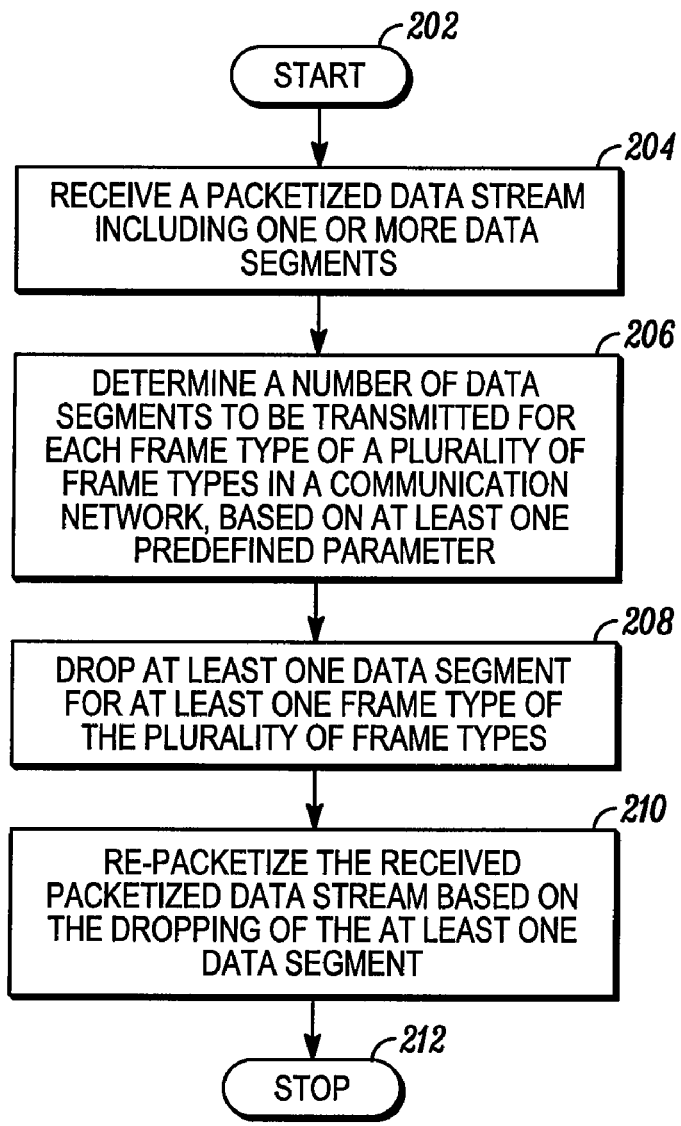
FIG. 2 is a flow diagram illustrating a method for managing a data stream in a communication network, in accordance with an embodiment of the present invention.

FIG. 2 is a flow diagram illustrating a method for managing data stream in a communication network in accordance with an embodiment of the present invention. To describe the method illustrated in FIG. 2, references will be made to FIG. 1, although, it will be apparent to those skilled in the art that the method can be applicable to any other embodiment of the present invention.

At step 202, the method for managing a data stream in a communication network is initiated. A data stream can be, for example, a Group of Pictures (GoP) in a Motion Picture Experts Group-2 (MPEG-2) transport stream or a Motion Picture Experts Group-4 (MPEG-4) transport stream. At step 204, a packetized data stream including one or more data segments is received. As already mentioned in FIG. 1, each data segment is either an Intra coded frame (I-frame), a Predicted frame (P-frame) or a Bi-predictive frame (B-frame).

In accordance with one embodiment of the invention, the received packetized data stream is either multiplexed with audio frames or is multiplexed without audio frames. When the data stream is multiplexed with audio frames, then the mentioned data segments can also be audio frames, along with I-, P- and B-frames.

At step 206, a number of data segments to be transmitted for each frame type of the plurality of frame types in the communication network is determined. The number of data segments to be transmitted is determined on the basis of at least one predefined parameter. An example of the predefined parameter can be an available bandwidth for the transmission of the received data stream in the communication network. For example, if the available bandwidth is 400 bytes and the received data stream has a size of 600 bytes, then only the data segments corresponding to the size of 400 bytes are selected to be transmitted. In this example, if each data segment has a size of 50 bytes, only 8 data segments are selected to be transmitted in the communication network. In accordance with one embodiment of the invention, the available bandwidth of the data stream is determined based on data size for each frame type in the previous data stream.

It should be noted that the data size is dependent on the type of data segment in the data stream, and the data size decreases with I-frame to P-frame to B-frame. The size of '50 bytes' is chosen above as an example to facilitate the description of this figure and does not illustrate an actual size of a data segment.

Another example of the predefined parameter above can be the type of the received data stream. For example, if a data stream is received which includes audio frames as well as video frames, then there may be a situation where all the video frames are transmitted and all the audio frames are not allowed to be transmitted. A typical example can be a video streaming of a football match on the Internet. In this case, if there is a bandwidth constraint, all the audio frames may not be transmitted and only the video frames may be transmitted. This may be because the user watching the streaming video may be more interested in watching the match, rather than listening to the commentary.

Yet another example of the predefined parameter can be the number of data segments received for each frame type in a previously received data stream. While using this parameter, it is assumed that the number of data segments for each frame type received in a data stream remains almost the same across various data streams. For example, if a previously received data stream had one I-frame, four P-frame and seven B-frames, then it is assumed that the next data stream will have the same number and arrangement of data segments. The use of this parameter becomes better understood with the help of the following example.

Assuming that the available bandwidth is 400 bytes and the previously received data stream had one I-frame, four P-frames and seven B-frames, the number of data segments to be transmitted for the current data stream is calculated. If the average size of an I-frame is 100 bytes, of an P-frame is 50 bytes, and of an B-frame is 40 bytes, then the number of I-frames to be transmitted may be calculated to be one I-frame, four P-frames and two B-frames. It should be noted that an I-frame is always transmitted in the communication network, irrespective of its size.

In another instance, the MPEG video might contain only I-frames. The present invention can work in this scenario also. In case I-frames are dropped, then all the P- and B-frames until the next I-frame are also dropped. Hence the invention allows for dropping I-frames also. In another instance, the invention can also allow for dropping of integral number of GoPs as well.

At step 208, at least one data segment for at least one frame type of the plurality of frame types is dropped from the received data stream. The data segment to be dropped is decided on the basis of the determined number of data segments to be transmitted for each frame type, the functional dependency between the one or more data segments, and the functional dependency between the plurality of frame types. In accordance with one embodiment of the invention, the functional dependency between the one or more data segments and the plurality of frame types is based on either one of Motion Pictures Experts Group-2 (MPEG-2) or Motion Pictures Experts Group-4 (MPEG-4) video semantics.

Step 208 becomes better understood with the help of the following example. Consider a situation where a data stream is received which has one I-frame, three P-frames and five B-frames, and the arrangement of the frames is 'IPBBPB-PBB'. Now, also assume that at step 206, it is determined that the number of data segments to be transmitted is one I-frame, two P-frames and three B-frames. In this case, one P-frame is to be dropped and two B-frames are to be dropped. Which of the three P frames is to be dropped and which two of the B-frames are to be dropped are determined on the basis of the functional dependency of the data segments and the frame types. It is known to those skilled in the art that a P-frame having more frames dependent on it has more 'importance' than those P-frames which have fewer frames dependent on them. Therefore, the last P-frame in the data stream has less importance in the data stream than the first P-frame. Therefore, in this case, the last P-frame may be chosen to be dropped. In the case of B-frames, since there is no dependency, the B-frames are dropped on the basis of a preset condition. For example, it may be set that every alternate B-frame is dropped from the received data stream.

A typical example for determining which data segment of which frame type is to be dropped is described now. It should be noted that the described algorithm is exemplary in nature and the invention can also work with the use of any other algorithm also. In particular, the described algorithm is an implementation of the 0/1 knapsack solution for the determination of an optimum number of data segments to be transmitted constrained by the bandwidth parameter. Those ordinarily skilled in the art can appreciate that the present method is suitable for any embodiment where the constraints can be other than a bandwidth constraint.

In accordance with one embodiment of the invention, a profit value may be associated with each of the frame types and a cost (bytes per second) incurred while transmitting a particular frame type is determined. It is assumed that the cost is the same for all the frames of a particular type. This can be achieved by assigning the average frame bandwidth as the cost to each frame type. The profit assigned to each frame is based on the frame dependency, as described above. Hence, I-frames are assigned the highest profit value. All B-frames are assigned the same profit value, as no frame depends on a B-frame. And P-frames are assigned a profit value which decreases with the position of the P-frame in the data stream.

Let the number of frames in a data stream be N and the available bandwidth be B. Let the set $C=\{c_1, c_2, \ldots c_n\}$ and $P=\{p_1, p_2, \ldots p_n\}$ be the cost and profit associated with the particular data stream. Let the normalized profit values be the set PC where $pc_i = p_i/c_i$. Let the elements of PC be sorted in the descending order and arranged as a list of values $A=\{a_1, a_2, \ldots a_n\}$. Without loss of generality, let $a_i \geq a_j$ if $i<j$ and $a_i$ is in the set PC. Given the functions $f: f(a_i)=c$ and $g: g(a)=p_j$, the task of the algorithm is to find s such that:

$$\sum_{i=1}^{N} f(a_i)x_i \leq B$$

$$1 \leq i \leq N$$

where, $$x_i = \begin{cases} 1 : 0 \leq i < s \\ 0 < x_i < 1 : i = s \\ 0 : i > s \end{cases}$$

The optimal solution of the equation mentioned above is given by:

$$Z(C(KP)) = \sum_{i=1}^{s-1} g(a_i) + g(a_s)x_s$$

where $$x_s = \frac{B - \sum_{i=1}^{s-1} f(a_i)}{f(a_s)}$$

If integrity bounds are imposed, then the following relationships are achieved:

$$|z(C(KP))| = \sum_{i=1}^{s-1} g(a_i) + |g(a_s)x_s|$$

$$|z'(C(KP))| = \sum_{i=1}^{s-1} g(a_i) + g(a_s)|x_s|$$

$$|z'(C(KP))| \leq |z(C(KP))| \leq z(C(KP))|$$

Choosing $|z'(C(KP))|$ would result in a profit which is less than the optimal by a value equal to $x_s g(a_s)$.

At step 210, the received data stream is re-packetized on the basis of the dropping of the at least one data segment. In accordance with one embodiment of the invention, the received packetized data stream is re-packetized, after the dropping of data segments, according to the User Datagram Protocol (UDP) format. Subsequently, the re-packetized data stream is transmitted in the communication network.

Another step (not shown) in the method for managing a data stream in a communication network is the storing of the count of data segments for each frame type received in the previous data stream and the current received data stream. The count is stored so that for the next data stream, the number of data streams to be transmitted may be determined, based on the previously received data stream. At step 212, the method for managing data stream in a communication network is terminated.

Figure 3:
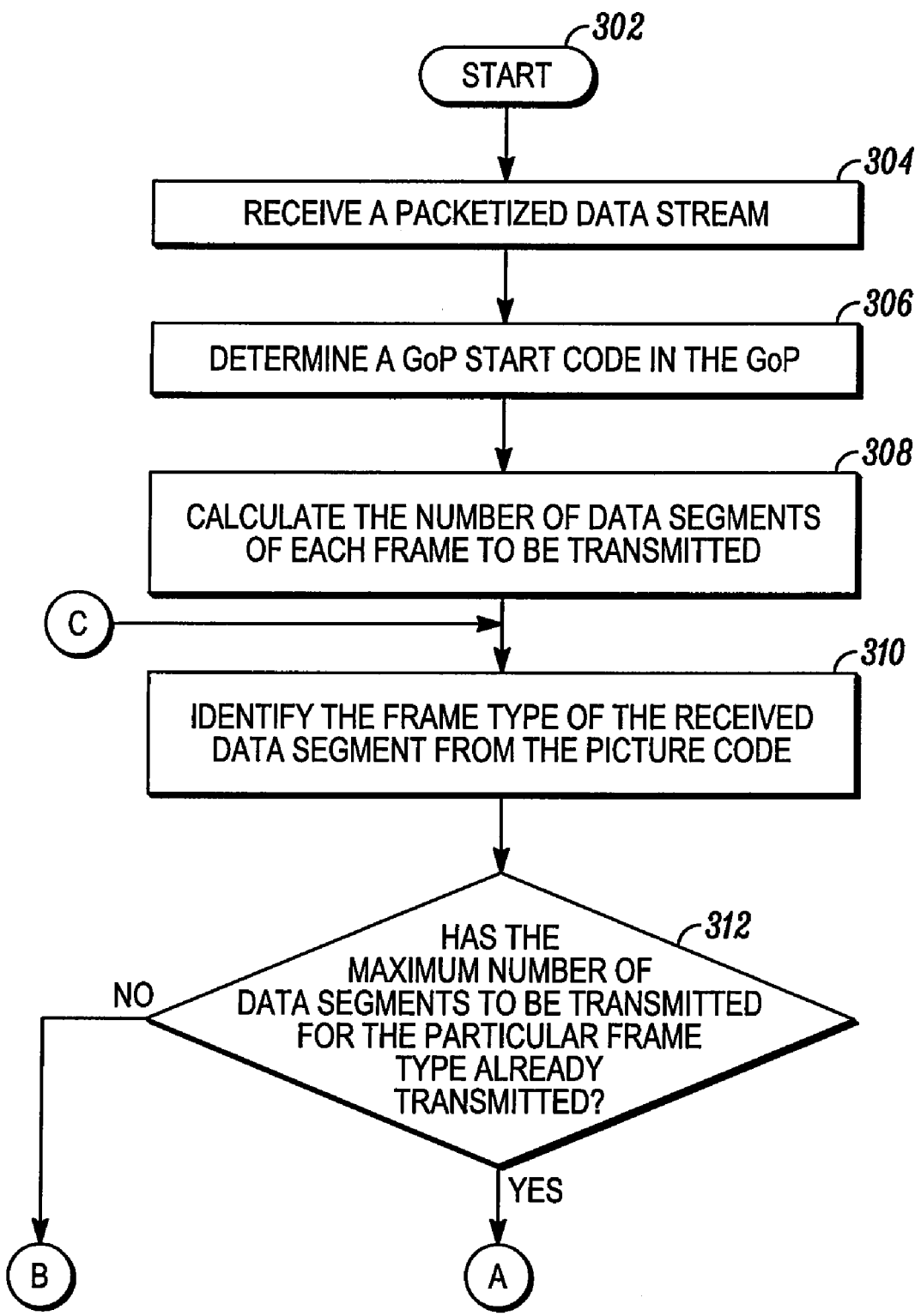
FIGS. 3 and 4 depict a flow diagram illustrating a method for managing a data stream in a communication network in accordance with another embodiment of the present invention.
Figure 4:
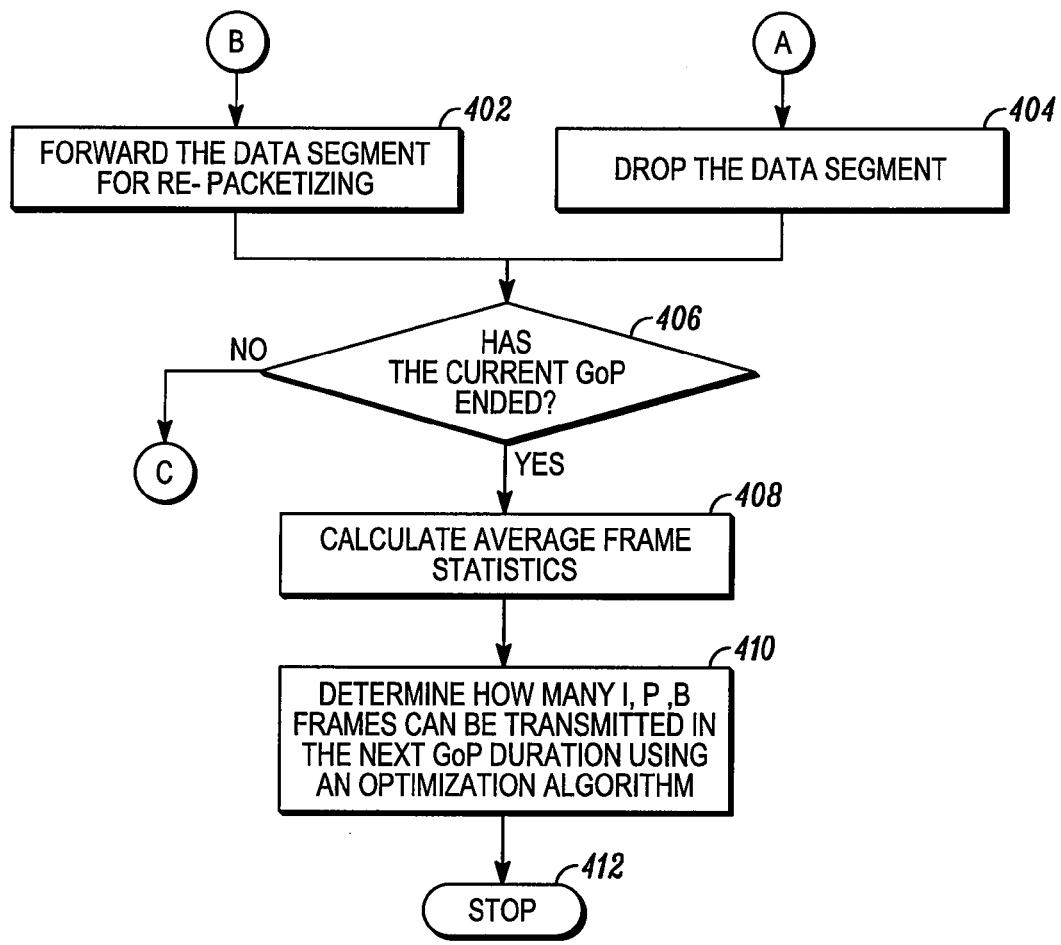

FIGS. 3 and 4 depict a flow diagram illustrating a method for managing a data stream in a communication network in accordance with another embodiment of the present invention. To describe the method illustrated in FIGS. 3 and 4, references will be made to FIGS. 1 and 2, although it will be apparent to those skilled in the art that the method can be applicable to any other embodiment of the present invention.

At step 302, the method for managing a data stream in the communication network is initiated. At step 304, a packetized data stream is received. As already mentioned in FIG. 2, the data stream includes one or more data segments corresponding to either audio frames or I-, P- or B-frames. In accordance with one embodiment of the invention, the received data stream is a GoP in an MPEG-2 transport stream.

At step 306, a GoP start code is determined in the received data stream. A GoP start code indicates the start of a new GoP. Typically, the first four bytes of the data stream indicates the GoP start code. At step 308, the number of data segments to be transmitted for each frame is determined for the new GoP. The entire method for determining the number of data segments to be transmitted has already been explained in conjunction with FIG. 2.

At step 310, a picture code of the received data segments within the data stream is identified to determine the frame type of the received data segment. For example, after the GoP start code is determined, an I-frame is received as the first frame. Typically, the next four bytes after the four bytes of the GoP start code indicate the picture code for an I-frame. When the reception of the I-frame is finished, another picture is code is determined. The next data segment, after the I-frame, may be a B-frame or a P-frame. Typically, a new picture code indicates the end of the last data segment and the start of a new data segment.

In accordance with one embodiment of the invention, the picture start codes may be split across two non-contiguous data streams and across two non-contiguous data segments. In this case, the last three bytes of the data segment are buffered and attached to the first byte of the next data segment. This way, a valid 4-byte identifier is formed. This approach helps in identifying frame types across data segments and data streams.

At step 312, a check is performed to determine whether the maximum number of data segments to be transmitted for the particular frame type has already been transmitted. For example, if the picture code suggests that the received data segment is of the P-frame type, then it is checked whether the maximum number of P-frames to be transmitted has already been transmitted or not. Referring now to FIG. 4, if the maximum number of data segments has not been transmitted for the particular frame type then, at step 402, the received data segment is forwarded for re-packetization.

If the maximum number of data segments has been transmitted for the particular frame type then, at step 404, the received data segment is dropped. Thereafter, steps 402 and 406 each proceeds to step 406, where it is determined whether the current GoP has ended or not. In accordance with one embodiment of the invention, a new GoP start code indicates the end of the last GoP.

If it is determined that the current GoP has not ended, then step 310 is again performed. In other words, another picture code is detected and the entire method, as stated above, is repeated. In accordance with one embodiment of the invention, if it is determined that the current GoP has ended, then the average frame statistics is calculated at step 408. Thereafter, at step 410 it is determined that how many I-, P-, and B-frames can be transmitted in the next GoP duration using an optimization algorithm. At step 412, the method for managing a data stream in the communication network is terminated.

Figure 5:
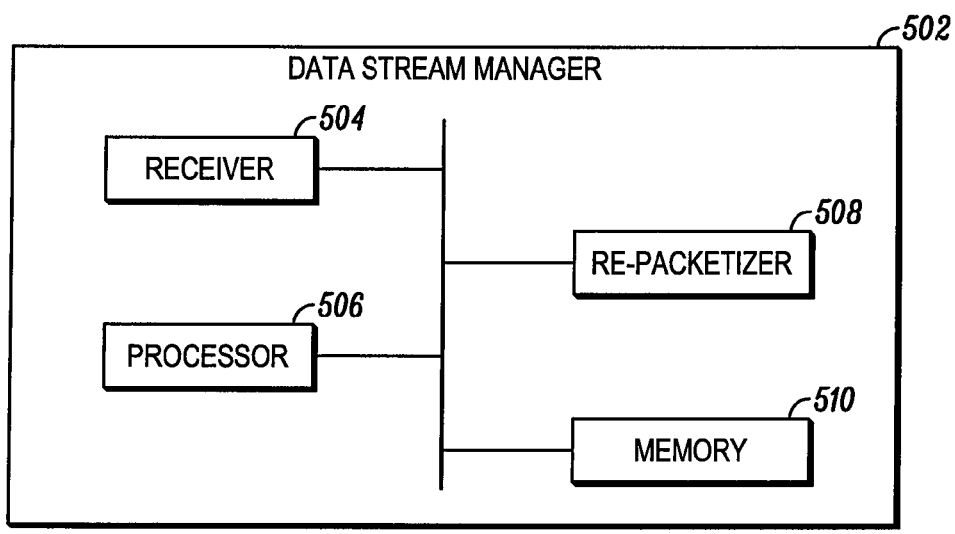
FIG. 5 is a block diagram of a data stream manager for managing a data stream in a communication network in accordance with an embodiment of the invention.

FIG. 5 illustrates a block diagram of a data stream manager 502 for managing a data stream in a communication network in accordance with an embodiment of the invention. Those skilled in the art will appreciate that the data stream manager 502 may include all or a few of the components shown in FIG. 5. Further, those ordinarily skilled in the art will understand that the data stream manager 502 may include additional components that are not shown here and are not germane to the operation of the data stream manager 502 in accordance with the inventive arrangements. Data stream manager 502 executes the methods described with reference to FIGS. 2, 3 and 4 and preferably is implemented in the network router 102, although it is understood that the data stream manager 502 can be used in any Other suitable environment or network.

As shown in FIG. 5, the data stream manager 502 includes a receiver 504, a processor 506, a re-packetizer 508 and a memory 510. The receiver 504 receives a packetized data stream including one or more data segments. As already mentioned in conjunction with previous figures, the packetized data stream is a GoP in an MPEG-2 transport stream multiplexed with or without audio frames and each data segment corresponds to a frame type of a plurality of frame types. For example, a data segment may be an I-frame, a P-frame or a B-frame of a GoP or an audio frame.

Typically, the receiver 504 determines that a new GoP is received by determining a GoP start code of the GoP. As already mentioned, a GoP start code indicates the start of the GoP and is usually the first four bytes of the received GoP. After the receiver 504 receives the GoP, the processor 506 determines the number of data segments to be transmitted for each frame type in the communication network based on one or more predefined parameters. As already explained in conjunction with FIG. 2, the predefined parameters can be, for example, an available bandwidth for the transmission of a data stream in the communication network, a type of the received packetized data stream, or a number of data segments for each frame type received in a previous data stream. The entire process of determining the number of data segments to be transmitted in the communication network using the mentioned parameters has already been explained in conjunction with FIG. 2.

When the processor 506 determines the number of data segments to be transmitted for each frame type, the processor 506 identifies the frame type of the received data segment. Typically, the processor 506 identifies the frame type of the data segment by determining the picture code of the data segment. The picture code is usually of 4 bytes size and is received before the data segment is received. In accordance with one embodiment of the invention, the processor 506 can also identify the frame type of the data segments across non-contiguous data segments and across non-contiguous data streams.

When the processor 506 identifies the frame type of the received data segment, the processor 506 either drops the data segment or sends the data segment to the re-packetizer 508 to for re-packetizing. The decision to drop the packet is based on the determined number of data segments to be transmitted for each frame, the functional dependency between the data segments, and the functional dependency between the frame types. As already mentioned, the functional dependency is based on either the Moving Picture Experts Group-2 (MPEG-2) video semantics or the Moving Picture Experts Group-4 (MPEG-4) video semantics. The process of dropping the data segments has already been explained in conjunction with FIG. 2.

When the processor 506 forwards data segment to the re-packetizer 508, the re-packetizer 508 re-packetizes the data stream on the basis of the dropping of the data segments and in such a way that the semantics of the data stream does not alter. In accordance with one embodiment of the invention, the re-packetizer 508 re-packetizes the data stream on the basis of the User Datagram Protocol (UDP) format, such that the data stream is coded in the MPEG-2 transport stream format and an UDP header is attached to it.

The data stream manager 502 also includes the memory 510 for storing a count of data segments for each frame type in a previous data stream and a count of data segments for each frame type in the received packetized data stream. The memory 510 uses a state machine to store the above mentioned count of data segments. An exemplary embodiment of the state machine is explained in FIG. 6. The memory 510 further includes computer readable program code for performing other functions associated with the data stream manager 502.

Figure 6:
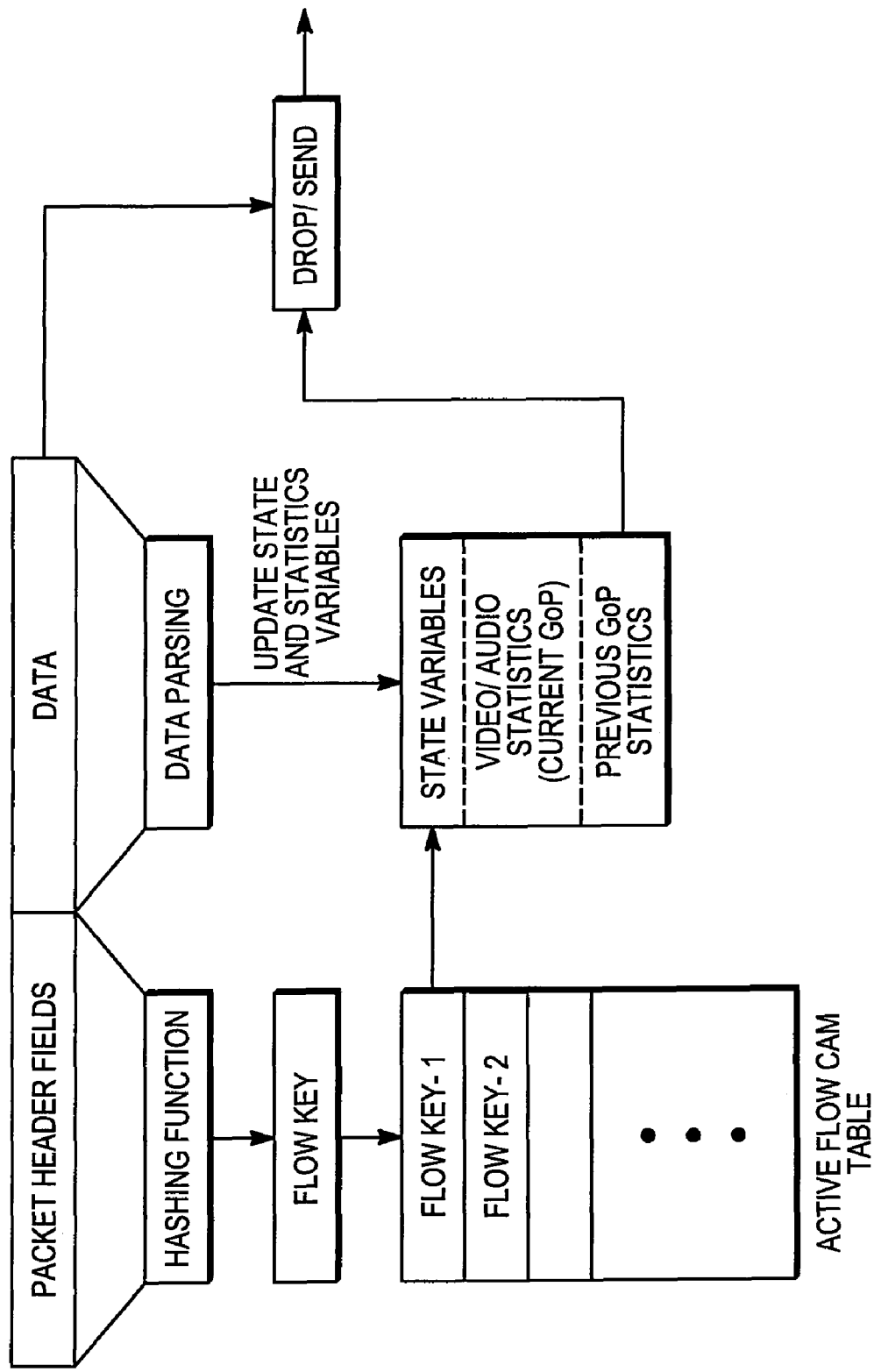
FIG. 6 is a block diagram of an exemplary state machine for storing information during the processing of a data stream in accordance with an embodiment of the present invention.

FIG. 6 illustrates an exemplary state machine for storing information during the processing of a data stream in accordance with an embodiment of the present invention. The figure shows a data stream having a packet header field and the data. The packet header field is usually a UDP header and the data includes the various data segments such as I-frames, P-frames and B-frames.

In accordance with one embodiment of the invention, when a data stream is received, a check is performed to determine whether the data stream belongs to a priority flow. Only if the data stream belongs to a priority flow, the data stream is forwarded for processing in the state machine. Typically, to determine whether a data stream belongs to a priority flow or not, the address contained in the UDP header of the data stream is checked against a look up table, which contains the addresses for all priority flow videos.

As shown, the packet header field is hashed into an active flow Content Addressable Memory (CAM) table. Thereafter, the source address, the destination address, the source port and the destination port act as a 'key' to this table. If the flow table entry to a particular key is not found, it is assumed that the data stream does not belong to the priority flow. When a data stream does belong to the priority flow, its data parsing begins. Thereafter, the state variables corresponding to the current data stream, audio or video statistics for the current and previous data streams are stored in the state machine.

Figure 7:
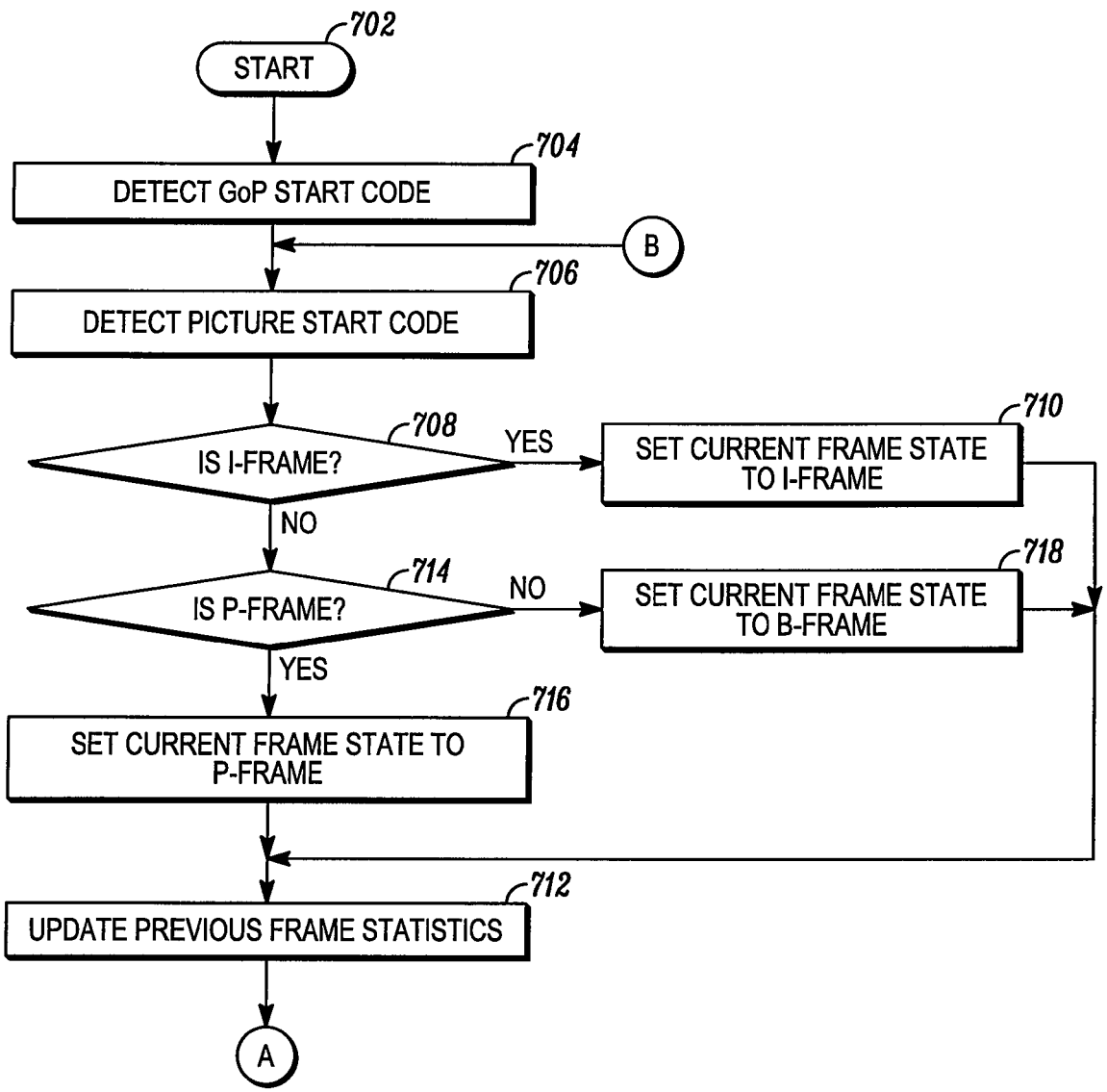
FIGS. 7 and 8 depict a flow diagram illustrating a method for storing information during the processing of a data stream in accordance with an embodiment of the present invention.
Figure 8:
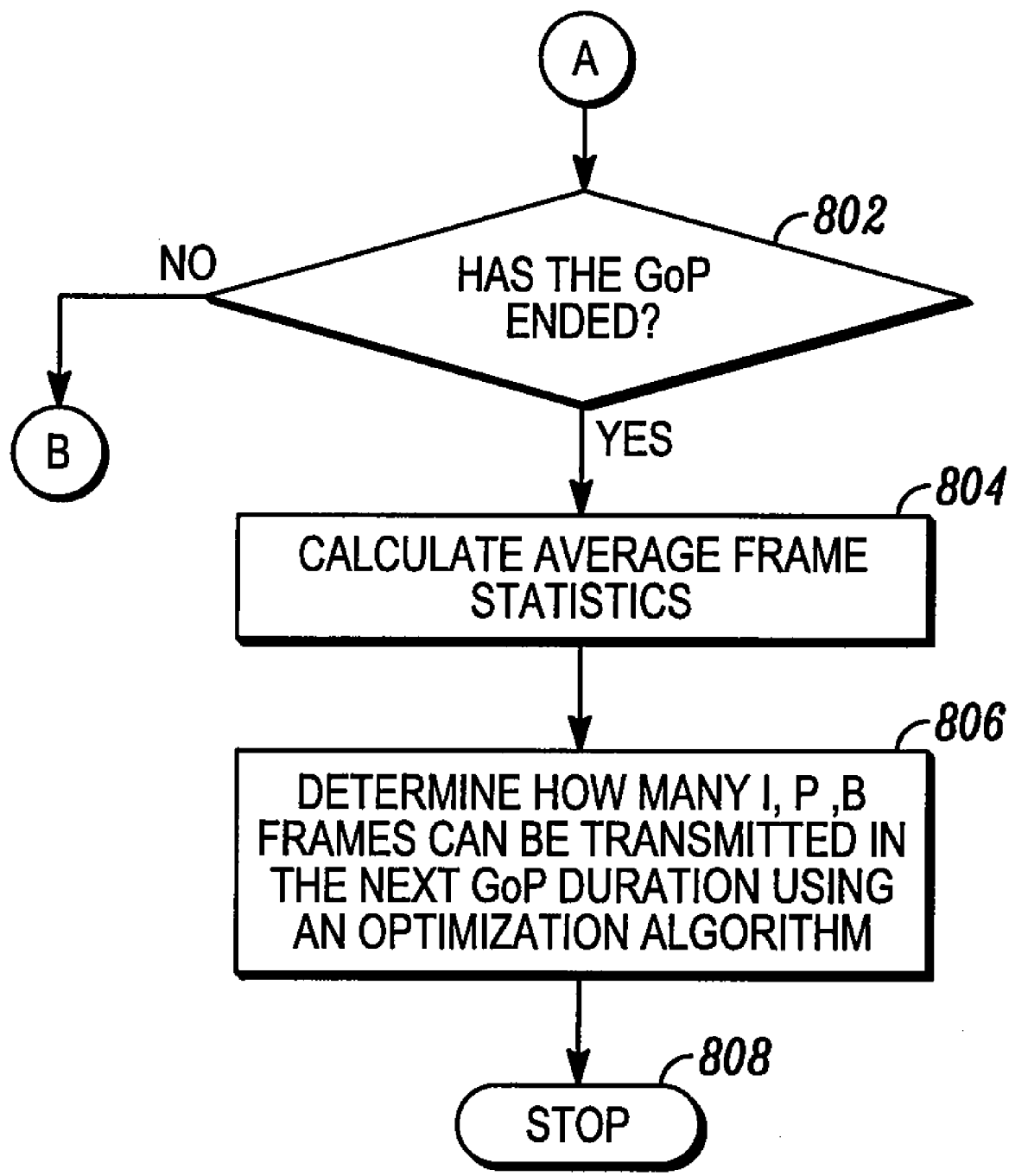

FIGS. 7 and 8 depict a flow diagram illustrating a method performed by data stream manager 502 for storing information during the processing of a data stream in accordance with an embodiment of the present invention. To describe the method illustrated in FIGS. 7 and 8, references will be made to FIGS. 1, 2, 3 and 4, although it will be apparent to those skilled in the art that the method can be applicable to any other embodiment of the present invention.

At step 702, the method for storing information during the processing of a data stream is initiated. At step 704, the start code of the data stream is detected. As already mentioned earlier, detection of the start code indicates starting of a new data stream. At step 706, a picture start code of the data stream is detected. The picture start code of a data stream indicates the start of a new data segment. The picture start code may also contain the information of the frame type of the current data segment. The data segment can be an I-frame, a P-frame or a B-frame. At step 708, it is checked whether the current data segment is an I-frame.

If the current data segment is determined to be an I-frame, then at step 710, the state variable that stores the current frame state is set to I-frame. After the state variable is set to I-frame, the previous frame statistics are updated at step 712. For example, suppose that a P-frame was being transmitted and then a picture start code is detected and the data segment for that picture start code is determined to be an I-frame. In this case, the count of P-frame (previous frame) that are transmitted is decremented by one.

If the current data segment is not an I-frame, then at step 714, it is checked whether the current data segment is a P-frame. If the current data segment is determined to be a P-frame, then at step 716, the state variable that stores the current frame type is set to P-frame. After the state variable is set to P-frame the previous frame statistics are updated at step 712, as explained earlier.

If, at step 714, it is determined that the current data segment is not a P-frame, then at step 718, the state variable that stores the current frame type is set to B-frame. After the state variable is set to B-frame, the previous frame statistics is updated at step 712, as explained earlier.

From step 712, the flow diagram proceeds to step 802, where it is determined whether the GoP reception has ended. If the GoP reception has not ended, then the steps 706 onwards are repeated. In accordance with one embodiment of the invention, if it is determined that the current GoP has ended, then an average frame statistic is calculated at step 804. Thereafter, at step 806 it is determined that how many I-, P-, B-frames can be transmitted in the next GoP duration using an optimization algorithm. At step 808, the method for storing information during the processing of a data stream is terminated.

Figure 9:
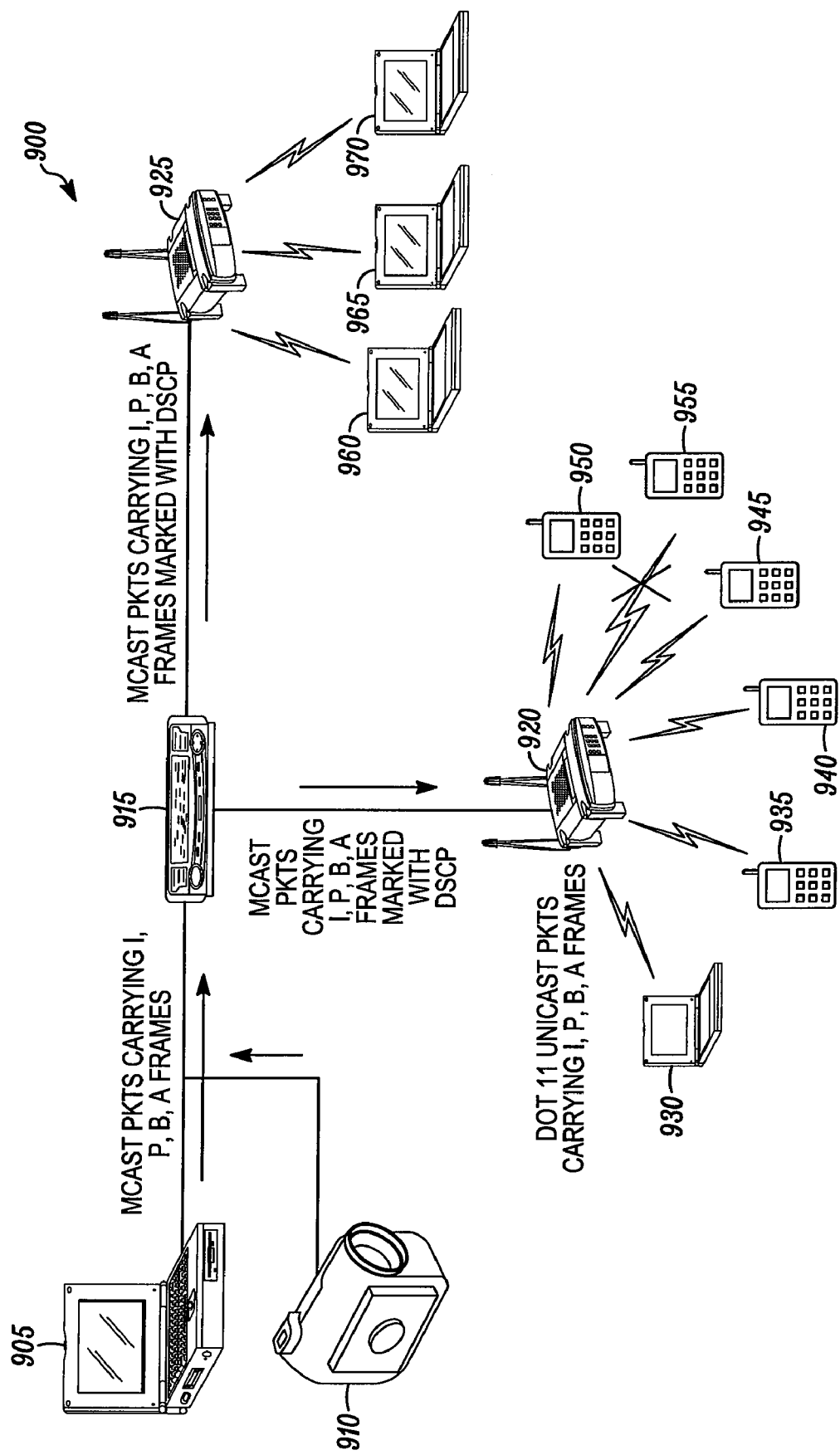
FIG. 9 is a system diagram illustrating multicast video streaming over a WLAN in accordance with an embodiment of the present invention.

FIG. 9 is a system diagram illustrating multicast video streaming over a WLAN 900, according to an embodiment of the present invention. For example, consider that the WLAN 900 includes a multicast video server 905 streaming multiple video steams at 1.5 Mega bits per second (Mbps), and a surveillance camera 910 that is feeding the video server 905. Multicast packets in the video streams include I, P, and B frames, as described herein. A network server 915 receives the video streams and, using a stateful firewall, performs a deep packet inspection (DPI) of the multicast packets. As part of the DPI process, the network server 915 marks packets containing different data (e.g., video "I", "P" and "B" frames and audio (A) frames) with different differentiated services code points (DSCPs). As known by those having ordinary skill in the art, DSCPs enable data traffic to be treated by intermediate systems with relative priorities based on a type of services (ToS) field. The network server 915 also performs audio/video packet splitting and real time transport procotol (RTP) sequence number re-adjusting.

Multicast packets carrying I, P, B, and A frames marked with the DSCPs are then routed to other parts of the WLAN 900, such as to a first wireless access point 920 and to a second wireless access point 925. In FIG. 9, consider that the first wireless access point 920 advertizes using its service set identifier (SSID) that it is dedicated to video streaming to mobile units. Further consider that the first wireless access point 920 has a fixed video bandwidth of 5 Mbps.

The first wireless access point 920 will therefore build a video-subscribed mobile unit table (VSMT) based on Internet Group Management Protocol (IGMP) report snooping, as known by those having ordinary skill in the art. The VSMT helps in converting multicast data packets to "n" IEEE 802.11 unicast frames (where "n" is a number of mobile units identified in the VSMT). Also, the VSMT helps to dynamically adjust a per mobile unit, per video stream bandwidth available for video.

The VSMT can be built as follows. The first wireless access point 920 is configured to identify the maximum number of mobile units allowed to receive video streams simultaneously. A list is then configured of multicast interne protocol (IP) addresses and port <MCAST IP, PORT> combinations on which the video streams will be streamed. Whenever a mobile unit connects successfully using a service set identifier (SSID), the first wireless access point 920 sends an IGMP general query to the mobile unit. If the mobile unit is interested in receiving a video stream the mobile unit sends a membership report. The first wireless access point 920 snoops the report and checks if the <MCAST IP, PORT> matches any of the configured video streams. If so, the first wireless access point 920 adds a <MCAST IP, PORT, MU MAC> tuple (where MU MAC is a mobile unit medium access control number) to a list of listeners used to convert the multicast stream to unicast if the number of listeners is less than the maximum number of mobile units allowed. Whenever a mobile unit, which is already connected to an SSID, sends an unsolicited IGMP membership report, the first wireless access point 920 snoops the report and checks if the <MCAST IP, PORT> matches any of the configured video streams. If so, the first wireless access point 920 add the <MCAST IP, PORT, MU MAC> tuple to a list of listeners used to convert the multicast stream to unicast (but only if the number of listeners is less than maximum number of mobile units allowed). Whenever a mobile unit, which is already connected to an SSID, sends an unsolicited IGMP leave message, the first wireless access point 920 snoops the leave message and checks if the <MCAST IP, PORT> matches any of the configured video streams. If so, the first wireless access point 920 removes the <MCAST IP, PORT, MU MAC> tuple from the list of listeners used to convert the multicast stream to unicast. The first wireless access point 920 will not forward IGMP membership reports and leave messages onto SSIDs. That forces mobile units to always send their membership reports (in response to a query) and leave messages.

Consider that three mobile units 930, 935, 940, each wirelessly connected to the first wireless access point 920, initially subscribe to the present 1.5 Mbps video stream flowing from the multicast video server 905. Based on the 5 Mbps video bandwidth of the first wireless access point 920, each of the mobile units 930, 935, 940 is allocated a bandwidth of 1.66 Mbps. Because the 1.66 Mbps bandwidth is greater than the 1.5 Mbps bandwidth of the input video stream, no packet discard processes are required. Dot 11 unicast packets carrying all the I, P, B, A frames of the 1.5 Mbps input video stream are thus transmitted from the first wireless access point 920 to each of the mobile units 930, 935, 940.

However, next consider that one additional mobile unit 945 subscribes to the video stream from the first wireless access point 920. The available video bandwidth for each mobile unit thus must be adjusted to 1.25 Mbps. Because 1.25 Mbps is less than the original 1.5 Mbps stream, a selective packet discard (SPD) algorithm as described herein is implemented to discard the excess 0.25 Mbps bandwidth. Thus the first wireless access point 920 functions, concerning operation of an SPD algorithm, as the network router 102 or the data stream manager 502 described above.

If a fifth mobile unit 950 then subscribes to the video stream from the first wireless access point 920, the video bandwidth for each of the mobile units 930, 935, 940, 945, 950 will be adjusted to 1 Mbps and the SPD algorithm will discard 0.5 Mbps of the original video stream data.

Further, consider that a ⅓ reduction in bandwidth from the original 1.5 Mbps to the SPD adjusted 1.0 Mbps is a maximum amount of packet discard based on a required quality of service (QoS). That means that if a sixth mobile unit 955 attempts to subscribe to the video stream, no entry will be created in the video subscribed mobile unit table at the first wireless access point 920 for the mobile unit 955, and the mobile unit 955 will not be allowed to receive the video stream.

Similar video subscribed mobile unit table construction and selective packet discard processes are executed at the second wireless access point 925 concerning various mobile units 960, 965, 970.

Figure 10:
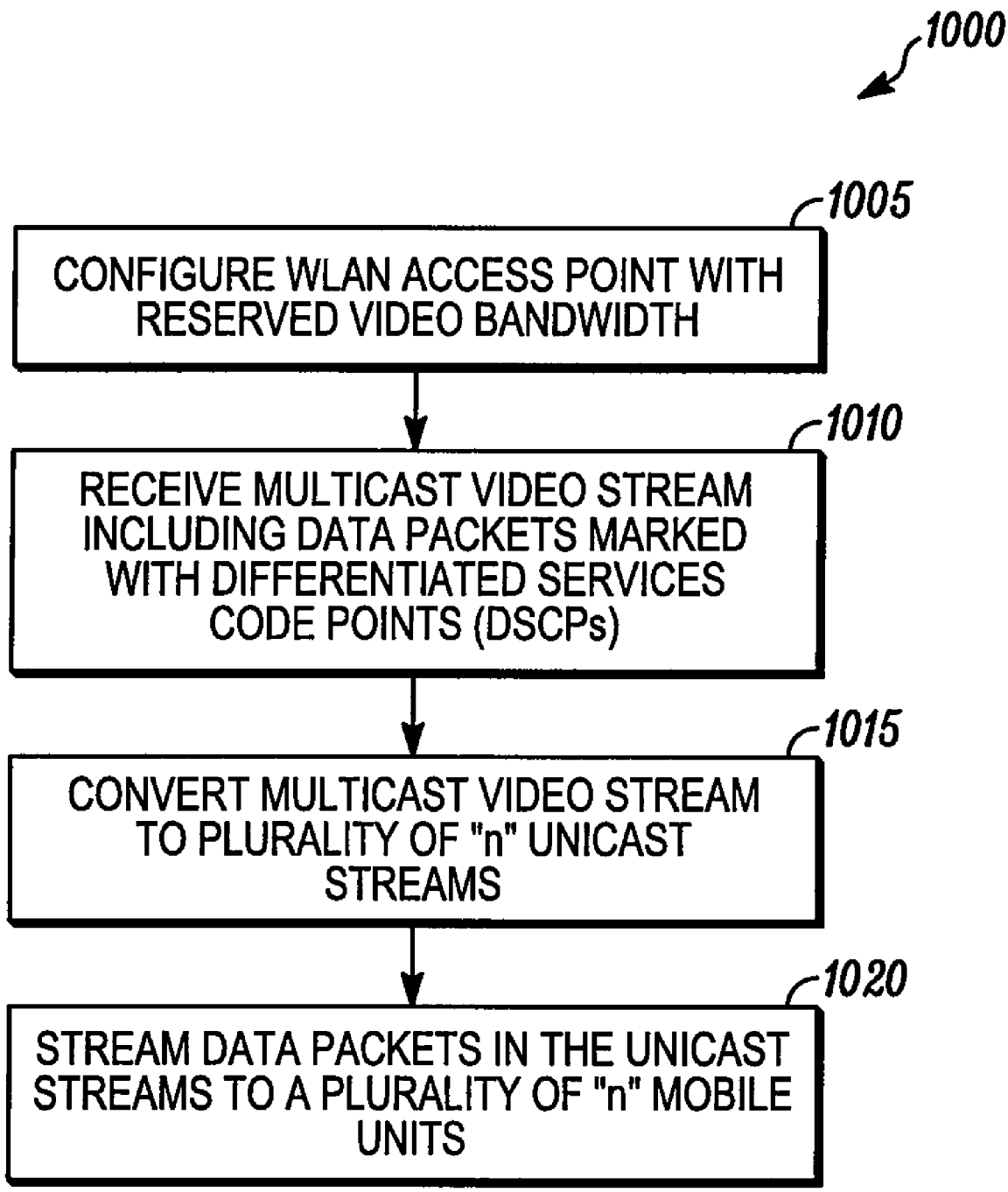
FIG. 10 is a flow diagram illustrating a method for multicast video streaming over a wireless local area network (WLAN) in accordance with an embodiment of the present invention.

FIG. 10 is a flow diagram illustrating a method 1000 for multicast video streaming over a wireless local area network (WLAN) according to an embodiment of the present invention. At step 1005, a WLAN access point is configured with a reserved video bandwidth. For example, the first wireless access point 920 is configured with a reserved video bandwidth of 5 Mpbs.

At step 1010, a multicast video stream including data packets marked with differentiated services code points (DSCPs) is received. For example, the network server 915 marks packets containing "I", "P", "B", and "A" frames of the 1.5 Mbps stream with DSCP codes, and the stream is then received at the first wireless access point 920.

At step 1015, the multicast video stream is converted to a plurality of "n" unicast streams. For example, the 1.5 Mbps video stream from the multicast video server 905 is converted to five unicast streams, where one unicast stream is designated for each of the mobile units 930, 935, 940, 945, 950.

At step 1020, data packets in the unicast streams are streamed from the access point to a plurality of "n" mobile units using a selective packet discard algorithm that employs the DSCPs. For example, dot11 unicast packets carrying I, P, B, and A frames are streamed from the first wireless access point 920 to each of the mobile units 930, 935, 940, 945, 950 using the DSCPs inserted by the network server 915 and using an SPD algorithm as described herein.

Various embodiments, as described above, provide a method and system for multicast video streaming over a WLAN. The described invention has an advantage that it overcomes the drawbacks of random packet loss to achieve a desired quality in situations of bandwidth constraints. Since MPEG has a functional dependency on the sequence of its frames in the data stream, random loss can spoil the video semantics. The invention implements a method for computing the number of packets for each type of frames to be transmitted in the communication network. Thereafter, based on the functional dependency between different frames, selected frames are dropped and are not transmitted. This ensures that the video or audio quality of the streaming video received by the user is not deteriorated significantly. Also, the present invention ensures that the MPEG video semantics are kept intact as different frames are dropped.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of the present teachings. The benefits, advantages, solutions to problems, and any element(s) that may cause any benefit, advantage, or solution to occur or become more pronounced are not to be construed as critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, or contains a list of elements does not include only those elements but may include other elements not expressly listed or inherent to such process, method, article, or apparatus. An element preceded by "comprises a . . . ", "has a . . . ", "includes a . . . ", or "contains a . . . " does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and system described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for multicast video streaming over a wireless local area network (WLAN), the method comprising:
    configuring a WLAN access point with a reserved video bandwidth;
    receiving a multicast video stream including data packets marked with differentiated services code points (DSCPs);
    converting the multicast video stream to a plurality of "n" unicast streams; and
    streaming data packets in the unicast streams from the WLAN access point to a plurality of "n" mobile units using a selective packet discard algorithm that employs the DSCPs,
        wherein the selective packet discard algorithm comprises:
            receiving a packetized data stream comprising one or more data segments, wherein each data segment of the one or more data segments corresponds to a frame type of a plurality of frame types;
            determining a number of data segments to be transmitted for each frame type of the plurality of frame types in the WLAN based on at least one predefined parameter;
            dropping at least one data segment for at least one frame type of the plurality of frame types based on:
                a number of data segments to be transmitted for each frame type;
                a functional dependency between the one or more data segments; and
                a functional dependency between the plurality of frame types; and
            re-packetizing the received packetized data stream based on the dropping of the at least one data segment.

2. The method of claim 1, wherein configuring the WLAN access point comprises building a table based on internet group management protocol reports.

3. The method of claim 1, wherein configuring the WLAN access point with a reserved video bandwidth comprises configuring the WLAN access point dynamically using a dynamic bandwidth allocation (DBA) technique.

4. The method of claim 1, wherein marking data packets with differentiated services code points (DSCPs) is performed using a deep packet inspection (DPI) engine.

5. The method of claim 1, wherein converting the multicast video stream to a plurality of "n" unicast streams comprises converting multicast packets to multiple dot11 unicast packets.

6. The method as recited in claim 1, wherein the at least one predefined parameter is based on one or more of:
    an available bandwidth for transmission of the data stream in the communication network;
    a type of the received packetized data stream; and
    a number of data segments for each frame type received in a previous data stream.

7. The method as recited in claim 6, wherein the available bandwidth of the data stream is determined based on data size for each frame type in the previous data stream.

8. The method as recited in claim 1, wherein the packetized data stream is a Group of Pictures (GOP) in at least one of a Motion Picture Experts Group-2 (MPEG-2) and a Motion Picture Experts Group-4 (MPEG-4) transport stream.

9. The method as recited in claim 8, wherein each data segment of the one or more data segments is at least one of a picture in the GOP and an audio frame.

10. A data stream manager, comprising:
a processor; and
a memory operatively coupled to the processor, wherein the memory comprises:
computer readable program code components for configuring the data stream manager with a reserved video bandwidth;
computer readable program code components for receiving a multicast video stream including data packets marked with differentiated services code points (DSCPs);
computer readable program code components for converting the multicast video stream to a plurality of "n" unicast streams; and
computer readable program code components for streaming data packets in the unicast streams from the Data stream manager to a plurality of "n" mobile units using a selective packet discard algorithm that employs the DSCPs, wherein the selective packet discard algorithm comprises:
computer readable program code components for receiving a packetized data stream comprising one or more data segments, wherein each data segment of the one or more data segments corresponds to a frame type of a plurality of frame types;
computer readable program code components for determining a number of data segments to be transmitted for each frame type of the plurality of frame types in the WLAN based on at least one predefined parameter;
computer readable program code components for dropping at least one data segment for at least one frame type of the plurality of frame types based on:
a number of data segments to be transmitted for each frame type;
a functional dependency between the one or more data segments; and
a functional dependency between the plurality of frame types; and
computer readable program code components for re-packetizing the received packetized data stream based on the dropping of the at least one data segment.

11. The data stream manager of claim 10, wherein configuring the data stream manager comprises building a table based on internet group management protocol reports.

12. The data stream manager of claim 10, wherein configuring the data stream manager with a reserved video bandwidth comprises configuring the data stream manager dynamically using a dynamic bandwidth allocation (DBA) technique.

13. The data stream manager of claim 10, wherein marking data packets with differentiated services code points (DSCPs) is performed using a deep packet inspection (DPI) engine.

14. The data stream manager of claim 10, wherein converting the multicast video stream to a plurality of "n" unicast streams comprises converting multicast packets to multiple dot11 unicast packets.

15. The data stream manager of claim 10, wherein the at least one predefined parameter is based on one or more of:
an available bandwidth for transmission of the data stream in the communication network;
a type of the received packetized data stream; and
a number of data segments for each frame type received in a previous data stream.

16. The data stream manager of claim 15, wherein the available bandwidth of the data stream is determined based on data size for each frame type in the previous data stream.

17. The data stream manager of claim 10, wherein the packetized data stream is a Group of Pictures (GOP) in at least one of a Motion Picture Experts Group-2 (MPEG-2) and a Motion Picture Experts Group-4 (MPEG-4) transport stream.

18. The data stream manager of claim 17, wherein each data segment of the one or more data segments is at least one of a picture in the GOP and an audio frame.

* * * * *

UNITED STATES PATENT AND TRADEMARK OFFICE
CERTIFICATE OF CORRECTION

PATENT NO. : 8,270,425 B2
APPLICATION NO. : 12/648496
DATED : September 18, 2012
INVENTOR(S) : Poola et al.

Page 1 of 1

It is certified that error appears in the above-identified patent and that said Letters Patent is hereby corrected as shown below:

On the Title Page, in item (56), under "OTHER PUBLICATIONS", in Column 2, Line 3, delete "OoS" and insert -- QoS --, therefor.

On Page 2, in item (56), under "OTHER PUBLICATIONS", in Column 2, Line 4, delete "U52009" and insert -- US2009 --, therefor.

In Column 5, Line 61, delete "P$_2$," and insert -- p$_2$, --, therefor.

In Column 5, Line 66, delete "f:f(a$_i$)=c and g:g(a)=p$_j$," and insert -- f:f(a$_i$)=c$_j$ and g:g(a$_i$)=p$_j$, --, therefor.

In Column 8, Line 5, delete "Other" and insert -- other --, therefor.

In Column 10, Line 38, delete "procotol" and insert -- protocol --, therefor.

In Column 10, Line 60, delete "interne" and insert -- internet --, therefor.

In Column 12, Line 7, delete "Mpbs." and insert -- Mbps. --, therefor.

Signed and Sealed this
Fifth Day of February, 2013

Teresa Stanek Rea
*Acting Director of the United States Patent and Trademark Office*